F. M. RICKETTS.
Device for Swaging Saw Teeth.
No. 231,615. Patented Aug. 24, 1880.
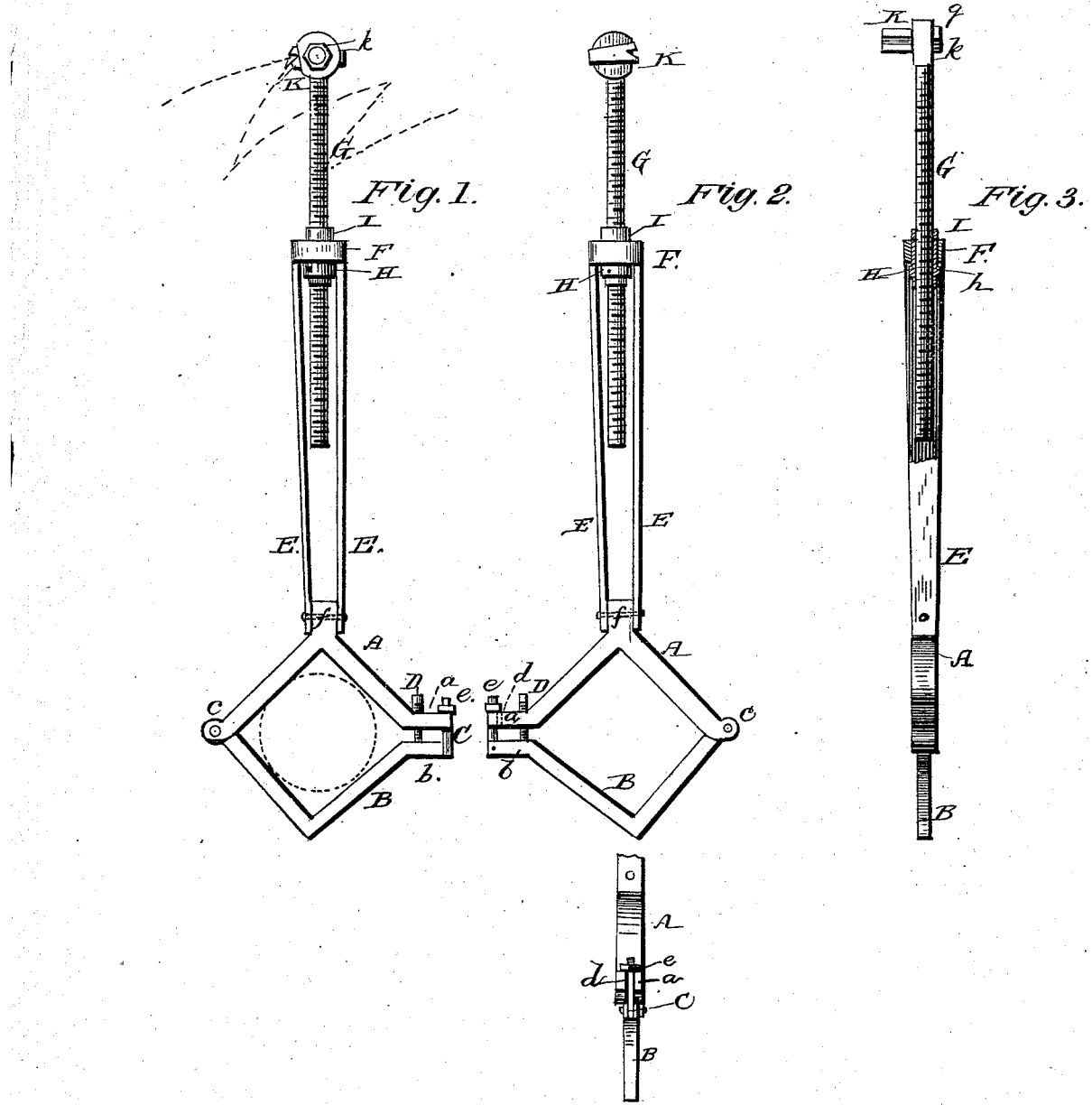

UNITED STATES PATENT OFFICE.

FRANCIS M. RICKETTS, OF SPICELAND, INDIANA.

DEVICE FOR SWAGING SAW-TEETH.

SPECIFICATION forming part of Letters Patent No. 231,615, dated August 24, 1880.

Application filed February 14, 1880.

*To all whom it may concern:*

Be it known that I, FRANCIS M. RICKETTS, of Spiceland, in the county of Henry and State of Indiana, have invented certain new and useful Improvements in Devices for Swaging Saw-Teeth; and I do hereby declare that the following is full, clear, and exact description of the invention, which will enable others skilled in the art to which it appertains to make and use the same, reference being had to the accompanying drawings, which form a part of this specification, and in which—

Figures 1 and 2 are side views and a detail view of my improved saw-swage; and Fig. 3 is an edgewise view, partly in section, of the same.

Similar letters of reference indicate corresponding parts in all the figures.

This invention has relation to that class of saw-swages which are used to swage the teeth of circular saws; and it consists in the detailed construction and combination of parts, as hereinafter more fully described.

In the drawings, A B is a clamp, which consists of two right-angled arms or pieces, hinged together at $c$ and bent outward at their opposite ends to form parallel lips or projections $a$ $b$, the uppermost one of which, $a$, has a slot, $d$.

C is a clamp-screw, which is hinged in the end of the lower lip, $b$, its shank fitting into the slot $d$ of the upper lip, upon which it may be adjusted by a jam-nut, $e$.

D is a set-screw, which works in a screw-threaded perforation in the upper lip, $a$, bearing with its lower end against the lip $b$, as clearly shown in Fig. 1 of the drawings.

The upper clamp-piece, A, has a solid lug or block, $f$, at its angle or elbow, to which are pivoted, to swing laterally, the parallel arms E, united at their upper ends by a perforated cross-piece, F, through which is inserted, with its lower end projecting down between the arms E, the screw or swage holder G. Upon this screw, below the cross-piece F, is inserted a screw-threaded collar, H, made with a shoulder, $h$, the part of the collar above the shoulder fitting into the perforation in the cross-piece F, on the opposite or upper side of which is a jam-nut, I.

The upper end of the swage-holder G has an eye, $g$, through which the shank of the notched swage-block K is inserted and held in place detachably by the nut $k$.

From the foregoing description, taken in connection with the drawings, the operation of this swage will be readily understood.

The device is inserted upon the collar of the saw arbor or mandrel by the clamp A B, and adjusted by means of the screws C D, so as to fit the collar closely and allow the swage-holder to be moved in the arc of a circle from tooth to tooth as the swaging proceeds.

The swage-block K is adjusted to fit saws of any dimensions by adjusting the jam-nut I and collar H upon the screw G, so as to bear from opposite sides against the cross-piece F of the arms E, the pivotal point upon the lug $f$ of the said arms permitting the swage-holder and swage to be swung out to one side from the face of the saw as it is moved from tooth to tooth.

The notched swage-block K being adjustable in the eye $g$ of the holder G enables it to be adjusted or set at any angle that the tooth may require, this double adjustment of the swage-block K enabling it not only to be used upon any sized saw, but with teeth of any angle and any depth of gullet.

Having thus described my invention, I claim and desire to secure by Letters Patent of the United States—

1. The combination, with the mandrel-clamp A B and hinged fork E F E, of the screw or swage holder G, provided with the swage K, the collar H, and jam-nut I, substantially as and for the purpose herein shown and described.

2. The herein-described device for swaging circular saws, consisting of the hinged clamp A B, having adjusting-screws C D, hinged fork E F E, longitudinally-adjustable screw or swage holder G, provided with the collar H, jam-nut I, and eye $g$, adjustable swage-block K, and jam-nut $k$, all constructed and combined to operate substantially as and for the purpose herein shown and set forth.

In testimony that I claim the foregoing as my own I have hereto affixed my signature in presence of two witnesses.

FRANCIS MARION RICKETTS.

Witnesses:
ASA HATCH,
PEARSON SMITH.